UNITED STATES PATENT OFFICE.

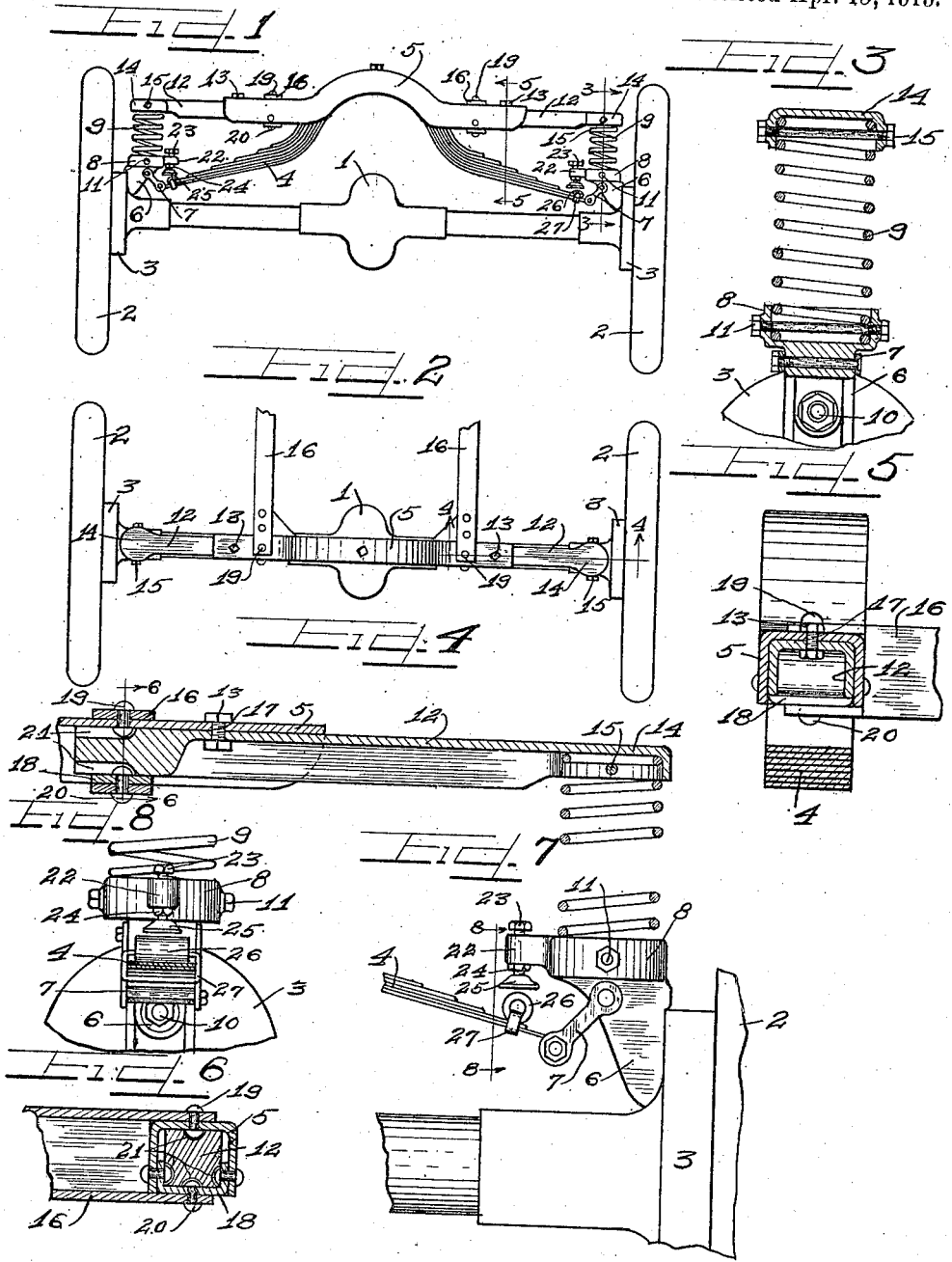

ALPHONSE A. SEBASTIAN, OF CHICAGO, ILLINOIS.

AUXILIARY SPRING ATTACHMENT FOR MOTOR-VEHICLES.

1,300,783.   Specification of Letters Patent.   Patented Apr. 15, 1919.

Application filed June 21, 1918. Serial No. 241,198.

*To all whom it may concern:*

Be it known that I, ALPHONSE A. SEBASTIAN, a citizen of the United States, and a resident of the city of Chicago, in the county of Cook and State of Illinois, have invented certain new and useful Improvements in Auxiliary Spring Attachments for Motor-Vehicles; and I do hereby declare that the following is a full, clear, and exact description of the same, reference being had to the accompanying drawings, and to the numerals of reference marked thereon, which form a part of this specification.

The springs with which automobiles are usually provided are designed for the general purpose for which the car is expected to be used, but it often occurs that the car is used otherwise than originally intended, as for instance when a pleasure car is converted into a truck or for some other reason the spring support is inadequate, in which case it is necessary to reinforce the springs. It may also be found that the rebound of the car body under the influence of the spring is too great and it may be desired to minimize such rebound. In either instance it is desirable to effect such change or correction either to reinforce the spring or minimize the rebound by providing attachments which may be readily and quickly applied to the car without the necessity of making extensive changes in the structure of the car.

It is an object, therefore, of this invention to provide auxiliary springs adapted to be easily and quickly attached to the chassis of a Ford or other cars so as to coact with the main springs of the car to absorb part of the shock and stress caused by the heavy loads.

It is a further and an important object of this invention to provide auxiliary spring mechanism with a bracket which is easily and effectively connected with the frame of the car so as to properly apply the effect of the auxiliary springs thereto to relieve the main spring of the stress and strain of the load.

It is a further object of this invention to provide an auxiliary spring attachment having a bracket adapted to coöperate with and engage standard parts of a motor car so as to be applied thereto without change or alteration of the car and which is thereby securely held and properly positioned to relieve the main spring and bear the stress and strain of the load.

It is a further object of my invention to provide a simple attachment which may be easily and readily applied so as to minimize the rebound effect of the main spring.

It is also an object of my invention to provide an attachment for minimizing the rebound, utilizing the resiliency of the main spring to avoid abrupt resistance to the rebound.

A still further object of my invention is to provide a device for minimizing the rebound which may readily be combined with and form a part of an attachment for reinforcing the main spring of the car.

My invention also has other important objects which will appear from the following specification and the accompanying drawings, in which I have described and shown my invention in a preferred form.

On the drawings:

Figure 1 is a fragmentary rear elevation of a chassis with a device embodying my improvements.

Fig. 2 is a top plan view thereof.

Fig. 3 is an enlarged longitudinal vertical section of one of the devices on the line 3—3 of Fig. 1.

Fig. 4 is an enlarged fragmentary sectional view on the line 4—4 of Fig. 2, showing in detail the method of attachment of one end of the device.

Fig. 5 is a fragmentary detail taken through the frame on the line 5—5 of Fig. 1.

Fig. 6 is an enlarged sectional view on the line 6—6 of Fig. 4.

Fig. 7 is a fragmentary rear elevation arranged substantially in coöperative relation with Fig. 4 and shows the rebound attachment.

Fig. 8 is a view on the line 8—8 of Fig. 7.

As shown on the drawings:

My invention is particularly applicable to a Ford car and is illustrated in connection therewith, although not intended to be limited thereto, and as shown the reference numeral 1, represents the rear axle and differential of a Ford motor car, 2, the rear wheels, 3, the brake housing, 4, the rear main spring, and 5, the transverse channel end frame member or bolster secured thereon all as is usual in Ford cars.

The reference numerals 6, indicate attaching members which are adapted to be attached to the brake housings 3, by means of bolts 10, in place of the usual members found on stock cars, and to these members the ends of the main springs 4, are pivotally connected by the links 7.

Rigidly secured to the member 6, is a cup shaped housing 8, providing an upwardly directed seat therein to receive one end of the spring 9, and a bolt 11, which is passed through oppositely disposed apertures in the wall of the spring seat and passes above one coil of the spring to firmly hold the spring seated in place.

The channel member or bolster 5, is channeled on the under side to embrace and connect with the centrally arched portion of the main spring 4, the ends of which latter extend beyond the ends of the frame member 5, and are connected with the brackets 6, on the brake housings 3, and this frame member is connected to the rear ends of the side sills 16, of the chassis.

The ends of the channeled member 5, project beyond the point at which the sills are connected therewith to furnish a sufficient bearing to support the body of the car, and there is a bolt hole 17, therein adjacent each end to admit a bolt for attaching the car body thereto.

The connection of the ends of the sills 16, with the bolster 5, is accomplished by providing a yoke shaped clip 18, the arms of which are riveted to the inner side of the flanges of the bolster 5, and the base of which is substantially flush with the lower edges of these flanges, and the end of each sill is cut away intermediate the upper and lower flanges thereof so that the ends of these flanges embrace the bolster, and the upper flange extension of the sill is riveted to the top wall of the bolster, as at 19, and the lower flange extension thereof is riveted to the clip 18, as at 20, all of which is clearly shown.

This is the standard construction in Ford motor cars, and in my invention, I take advantage of this standard construction to effect the attachment of my auxiliary springs so that the upper bracket which connects with the upper end of my spring may be connected to the frame of the car without the necessity of making bolt holes or any change or alteration whatever but by utilizing standard facilities with which the frame of the motor car is already provided.

Rigidly secured to the ends of the bolster 5, are arms or extensions members 12, having formed at their outer ends round or cup shaped downwardly facing spring seat housings 14, adapted to receive the upper ends of the springs therein and a bolt 15, which is passed through said housing and firmly engages the last coil of the spring which is held between the bolt and the wall or seat of the housing.

The inner end of the bracket 12, is formed so as to fit in the channel of the bolster 5, and the extreme inner end of this bracket is adapted to be inserted in the loop or socket of the standard frame structure formed by the clip 18 and channel iron, said end being suitably grooved as at 21, to pass the heads of the rivets used in assembling these standard parts of the frame. A perforation is provided in the bracket 12, which, when the inner end of the bracket is inserted in place between the clip 18, and the bolster 5, registers with the perforation 17, with which the frame member 5, is provided for connecting the body of the car thereto, and a bolt 13, is passed through these registering openings so as to hold the bracket member 12, securely connected to the frame 5.

The greater strain on the bracket 12 is that of the weight of the load which normally effects an upward pressure at the outer end of the bracket 12, and the bolt 13 serves at such time merely to hold the parts together, the strain being borne by the engagement of the bracket 12 with the under face of the bolster 5, and the clip 18.

The rebound or upward throw of the car body which is yieldingly resisted by means of the springs 9, by reason of the ends thereof being secured to the brackets 6 and 12, by means of the bolts 11 and 15, respectively, exerts a lesser strain on the connection of the brackets 12, with the member 5, and the bolts 13, act at such time to hold the brackets 12 and bolster 5, from separation.

As an additional means to counteract the rebound of the spring 4, and also the spring 9, when used in connection therewith the seat 8, of the bracket 6, is formed with the lug 22 extending inwardly therefrom over the outer end of the main spring 4, and through this lug 22, is passed vertically a bolt or cap screw 23, which has a threaded connection with the lug and is provided with a lock nut 24, whereby the bolt may be firmly secured in desired position of adjustment. The lower end of this bolt has an abutment or contact plate 25, which is adapted to be engaged, upon rebound of the main spring, by a bumper 26, preferably of rubber or similar material which will give no sound upon impact, which bumper is held in proper place on the spring 4 by means of the clip 27.

I have shown the rebound minimizer in connection with the auxiliary spring structure as the combined attachment effects a perfect control over the operation of the main spring. However, as it will no doubt be readily apparent either the auxiliary spring or the rebound minimizer may be used independently of the other attachment and my invention embraces the independent or combined use thereof.

The operation is as follows:

The device is attached by an attaching member or support 6, in lieu of the member that originally comes with the car. This is apertured to permit attachment of the connecting links 7, for the main spring 4. The extension 12, is bolted to the rear end frame member and the spring inserted in the housings, and the bolts 11 and 15, inserted. The clips and bumpers 26—27, are then attached to the spring 4, and the bolts 23, adjusted to counteract the rebound to the desired extent and the car is then ready for use.

It will be noted that the springs 9, may be made of any desired strength and coact with the main spring to resist the shock and compression of the load, so that very heavy loads may be moved in these light cars without danger of breaking the main springs, and it is also to be noted that inasmuch as these springs are rigidly secured at their ends in their respective housing seats they have a tendency to prohibit the quick rebound of the body, thereby prohibiting the severe strain caused by rough and uneven roads, and furthermore that owing to the springs being rigidly secured at their ends to the respective seats these springs exert a pulling tension and prevent swaying and rocking of the car body, thereby insuring that the contents of the truck will not be badly shaken up and broken and insuring longer life to the car as a whole.

When the car body is thrown upwardly due to a previous compression of the spring 4 and also the auxiliary springs 9, when used, the center of the main spring 4 is elevated and the outer ends of this spring are drawn inwardly and upwardly, such movement being permitted owing to the connection of the ends of the spring to the bracket 6, by means of the links 7. The bumpers 26, being spaced a short distance from the outer ends of the spring 4, are thereby brought into contact with the abutment plates 25, and act thereafter as a fulcrum so that further movement of the center of the spring bends the spring 4, and the rebound of the car body is thereby quickly and yieldingly counteracted.

I am aware that the details of construction may be varied through a wide range and I therefore do not propose limiting this application otherwise than necessitated by the prior art.

I claim as my invention:

1. In an automobile, the combination with a transversely extending bolster channeled on its under side for connection with the arched central portion of the automobile main spring, and yoke-shaped clips fixed in the channel of said bolster to provide, in connection with said bolster, attaching means for the side sills of the automobile, said bolster and clips forming sockets, of brackets at the ends of said bolster having their inner ends inserted into the sockets formed by said bolster and clips and bolted to said bolster outwardly of said sockets, and auxiliary springs at the outer ends of said brackets adapted to reënforce the main spring and to press the brackets against the projecting end portions of the channeled member.

2. In an automobile, the combination with a transversely extending bolster channeled on its under side for connection with the arched central portion of the automobile main spring, and yoke-shaped clips fixed in the channel of said bolster to provide, in connection with said bolster, attaching means for the side sills of the automobile, said bolster and clips forming sockets, of brackets at the ends of said bolster having their inner ends inserted into the sockets formed by said bolster and clips, said inner ends being grooved to pass the bolt or rivet ends connecting said bolster with the automobile sills, and said brackets being bolted to said bolster outwardly of said sockets, and auxiliary springs at the outer ends of said brackets adapted to reënforce the main spring and to press the brackets against the projecting end portions of the channeled member.

3. In a device of the class described, the combination of a vehicle having a transverse axle, a leaf spring centrally arched above and extended lengthwise of the axle, a bracket at each end of the axle having a loose link connection with the adjacent end of the spring and having a portion thereof projecting over the outer end of the spring to engage the main spring and thereby utilize the resilience thereof to minimize the rebound thereof, a frame supported on the centrally arched portion of the main spring and having portions projecting over the brackets at the ends of the axle, and a spring compressed between the outer end of each projecting portion and the adjacent bracket on the end of the axle for reinforcing the main spring.

In testimony whereof I have hereunto subscribed my name in the presence of two subscribing witnesses.

ALPHONSE A. SEBASTIAN.

Witnesses:
CHARLES W. HILLS, Jr.,
EARL M. HARDINE.

Copies of this patent may be obtained for five cents each, by addressing the "Commissioner of Patents, Washington, D. C."